United States Patent
Peng

(10) Patent No.: US 9,202,487 B2
(45) Date of Patent: Dec. 1, 2015

(54) LIGHT SOURCE ALIGNMENT FOR HEAT ASSISTED MAGNETIC RECORDING

(71) Applicant: Seagate Technology LLC, Cupertino, CA (US)

(72) Inventor: Chubing Peng, Eden Prairie, MN (US)

(73) Assignee: Seagate Technology LLC, Cupertinio, CA (US)

( * ) Notice: Subject to any disclaimer, the term of this patent is extended or adjusted under 35 U.S.C. 154(b) by 0 days.

(21) Appl. No.: 13/931,019

(22) Filed: Jun. 28, 2013

(65) Prior Publication Data
US 2014/0307533 A1 Oct. 16, 2014

Related U.S. Application Data

(60) Provisional application No. 61/810,580, filed on Apr. 10, 2013.

(51) Int. Cl.
*G11B 13/08* (2006.01)
*G11B 5/48* (2006.01)
*G11B 11/105* (2006.01)
*G11B 5/105* (2006.01)
*G11B 13/04* (2006.01)
*G11B 5/00* (2006.01)

(52) U.S. Cl.
CPC ............. *G11B 5/4866* (2013.01); *G11B 5/105* (2013.01); *G11B 11/10539* (2013.01); *G11B 13/045* (2013.01); *G11B 2005/0021* (2013.01)

(58) Field of Classification Search
CPC ..................... G11B 5/4866; G11B 2005/0021; G11B 11/10539; G11B 11/10593; G11B 7/12
USPC ........ 360/59; 369/13.02, 13.11, 13.12, 13.24, 369/13.32, 13.29, 112.16
See application file for complete search history.

(56) References Cited

U.S. PATENT DOCUMENTS

| 7,930,817 | B2 * | 4/2011 | Takayama | G11B 5/314 216/22 |
| 8,149,653 | B2 | 4/2012 | Shimazawa et al. | |
| 8,243,561 | B2 | 8/2012 | Matsumoto | |
| 8,369,191 | B2 | 2/2013 | Shimazawa | |

(Continued)

FOREIGN PATENT DOCUMENTS

JP 2012084216 4/2012

OTHER PUBLICATIONS

European Search Report dated Mar. 25, 2015 from European Application No. 14164244.7, 10 pages.

(Continued)

*Primary Examiner* — Thomas Alunkal
(74) *Attorney, Agent, or Firm* — Hollingsworth Davis, LLC

(57) ABSTRACT

An approach for aligning a light source on a slider involves filtering light emerging from the air bearing surface of a (ABS) of a heat assisted magnetic recording (HAMR) slider. A first portion of the emerging light is emitted by a near field transducer in response to optical excitation and has a component having a first polarization state. A second portion of the emerging light including stray light has polarization states different from the first polarization state. The polarizing filter substantially transmits light having the first polarization state and substantially rejects light having a polarization state orthogonal to the first polarization state. Alignment coordinates for the light source are determined based on the light transmitted through the polarizing filter.

17 Claims, 12 Drawing Sheets

(56) References Cited

U.S. PATENT DOCUMENTS

| | | | |
|---|---|---|---|
| 8,391,107 B2 | 3/2013 | Gage et al. | |
| 8,393,074 B1* | 3/2013 | Takayama | G11B 5/314 250/201.3 |
| 8,395,971 B2 | 3/2013 | Sasaki et al. | |
| 8,406,089 B2 | 3/2013 | Sasaki et al. | |
| 8,406,090 B2 | 3/2013 | Juang et al. | |
| 8,432,781 B2 | 4/2013 | Knappmann et al. | |
| 2007/0159718 A1* | 7/2007 | Kim | G11B 5/02 360/125.03 |
| 2008/0158730 A1* | 7/2008 | Furukawa | G11B 5/1272 360/110 |
| 2009/0225464 A1 | 9/2009 | Juang et al. | |
| 2009/0262608 A1* | 10/2009 | Kurita | G11B 5/314 369/13.33 |
| 2011/0216635 A1 | 9/2011 | Matsumoto | |
| 2011/0228651 A1 | 9/2011 | Gage et al. | |
| 2011/0228652 A1 | 9/2011 | Gage et al. | |
| 2011/0228653 A1 | 9/2011 | Shimazawa et al. | |
| 2011/0299080 A1* | 12/2011 | Peng | G11B 5/455 360/125.03 |
| 2012/0092971 A1* | 4/2012 | Schreck | G11B 5/314 369/13.24 |
| 2012/0117791 A1* | 5/2012 | Hara | G02B 6/4202 29/603.07 |
| 2012/0134246 A1 | 5/2012 | Shimazawa | |
| 2012/0163137 A1 | 6/2012 | Wang et al. | |
| 2012/0257488 A1 | 10/2012 | Knappmann et al. | |
| 2013/0135975 A1 | 5/2013 | Gage et al. | |

OTHER PUBLICATIONS

Office Action dated Jul. 28, 2015 from Japanese Application No. 2014-080206, 3 pages.

\* cited by examiner

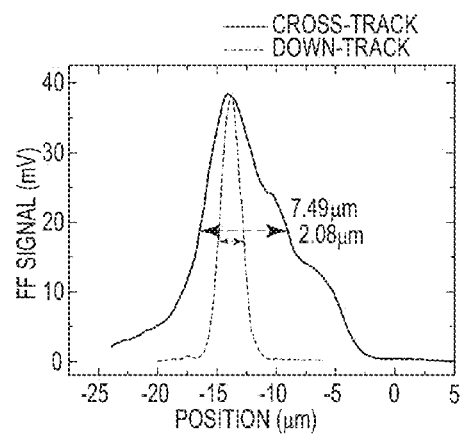 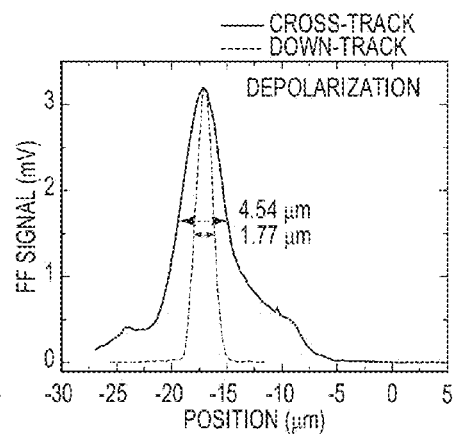
Fig. 6A    Fig. 6B
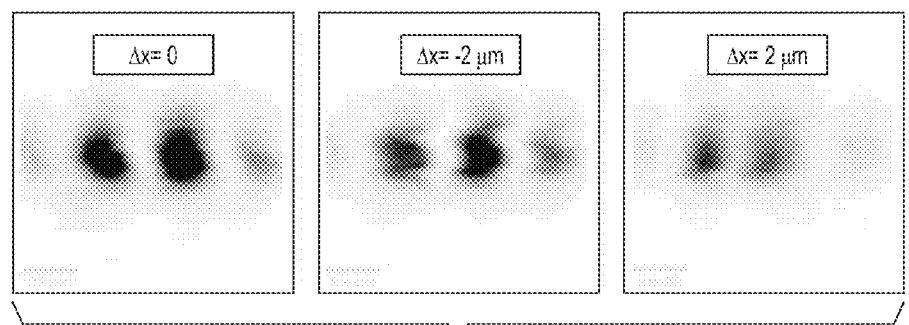
Fig. 6C
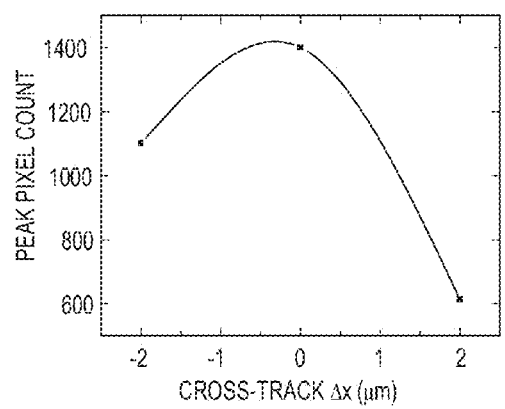
Fig. 6D

LIGHT SOURCE ALIGNMENT FOR HEAT ASSISTED MAGNETIC RECORDING

RELATED PATENT DOCUMENTS

This application claims the benefit of provisional Patent Application Ser. No. 61/810,580 filed on Apr. 10, 2013, to which priority is claimed pursuant to 35 U.S.C. §119(e) and which is hereby incorporated herein by reference in its entirety.

SUMMARY

Various embodiments described in this disclosure relate to fabrication of a light source-slider assembly for heat assisted magnetic recording.

Some embodiments involve methods for aligning a light source, such as a laser diode, with a slider. In some implementations, light emerging from an air bearing surface (ABS) of a heat assisted magnetic recording (HAMR) slider is collected. A first portion of the light is coupled into the waveguide ("optical excitation") and interacts with a near field transducer in response to the optical excitation. The first portion of light emerging from the slider contains radiation from the near-field transducer. A second portion of the light emerging from the slider includes stray light, which is not coupled into the waveguide and does not interact with the near-field transducer. The radiation from the near-field transducer in the first portion of light has a polarization component (hereafter referred to the first polarization state) orthogonal to that of the optical excitation and the stray light. The light that emerges from the ABS is filtered using a polarizing filter. The polarizing filter substantially transmits light having the first polarization state and substantially rejects light having a polarization state orthogonal to the first polarization state. Light transmitted through the polarizing filter is detected. Alignment coordinates of the light source are determined based on the light transmitted through the polarizing filter.

Some embodiments are directed to an apparatus that includes a polarizing filter configured to filter light emerging from an air bearing surface (ABS) of a heat assisted magnetic recording (HAMR) slider. The light emerging from the ABS includes light emitted by a near field transducer (NFT) in response to optical excitation and having a component of a first polarization state, a second portion of the light including stray light and the optical excitation. The second portion of light has polarization states different from the first polarization state. The polarizing filter is configured to substantially transmit light having the first polarization state and to substantially reject light having a polarization state orthogonal to the first polarization state. A detector is arranged to detect light transmitted through the polarizing filter and to generate an electrical signal in response to detected light. A light source-slider assembly mechanism includes a fixture configured to hold the light source relative to a mounting region of the slider and a controller configured to receive the electrical signal and to operate the fixture to cause relative movement between the light source and the slider.

Some embodiments involve an alignment apparatus. The apparatus includes a polarizing filter configured to filter light emerging from an air bearing surface (ABS) of a heat assisted magnetic recording (HAMR) slider. The light emerging from the ABS includes light emitted by a near field transducer (NFT) in response to optical excitation and having a component of a first polarization state and a second portion of the light including stray light as well as optical excitation. The second portion of light has polarization states different from the first polarization state. The polarizing filter is configured to substantially transmit light having the first polarization state and to substantially reject light having a polarization state orthogonal to the first polarization state. A detector is arranged to detect light transmitted through the polarizing filter and to generate an electrical signal in response to detected light. An alignment mechanism is configured to align the light source with the slider based on the electrical signal.

BRIEF DESCRIPTION OF THE DRAWINGS

FIGS. 6A-6D provide results of testing a first three-mirror light on slider arrangement with FIG. 6A showing profiles of far-field intensity as a function of diode position without a polarizing filter, FIG. 6B showing the same with a polarizing filter, FIG. 6C depicting profiles of near-field intensity at the air bearing surface (ABS) at $\Delta x=0$, $-2$, and $+2$ micrometers ($\mu m$) after alignment of the light source with the slider using the polarizing filter, and FIG. 6D showing a graph of the near-field intensity versus cross-track $\Delta x$ after alignment of the light source and the slider using the polarizing filter.

DETAILED DESCRIPTION

Figure 1A:
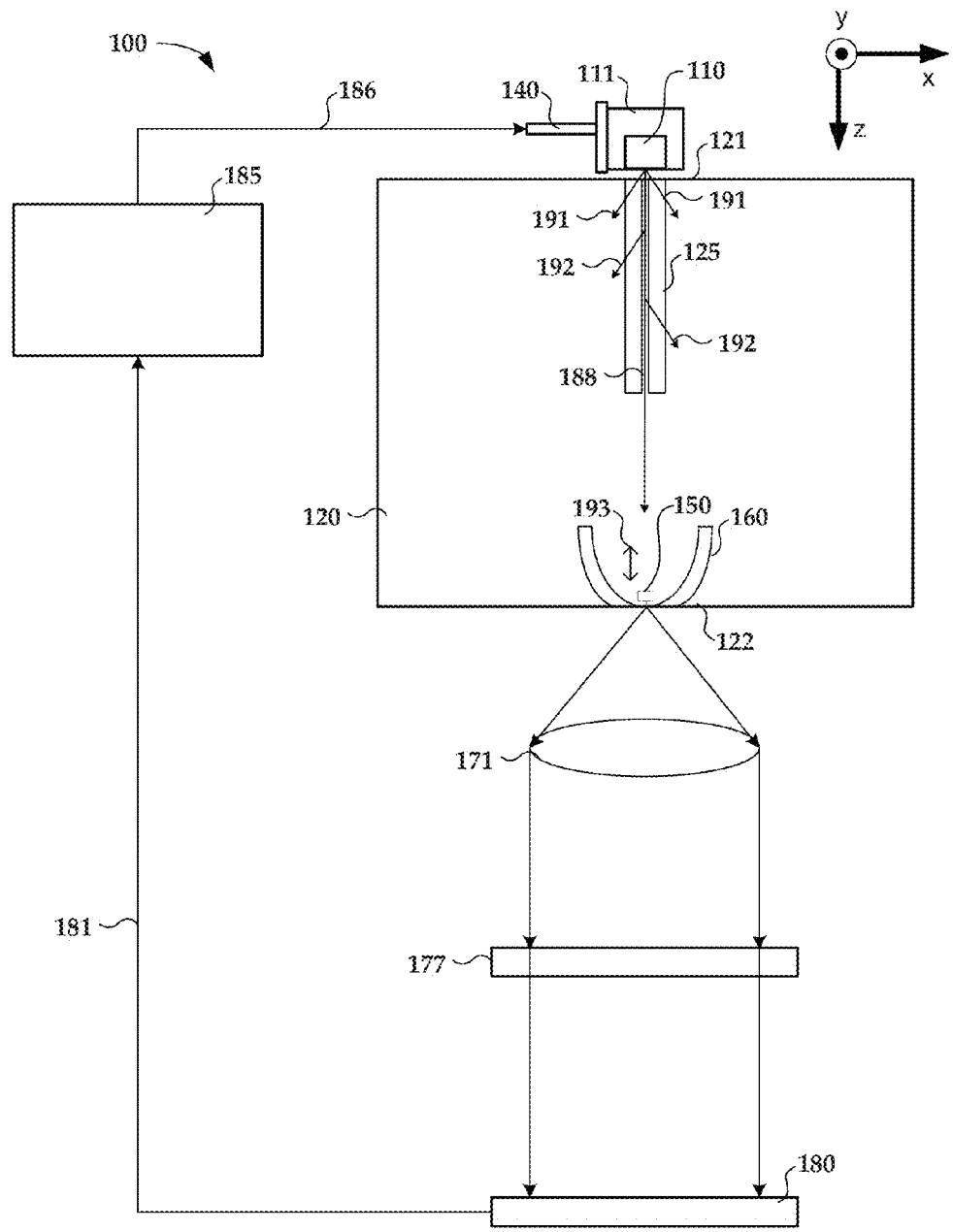
FIG. 1A is a block diagram of an embodiment of an alignment apparatus showing a slider having a straight through light delivery path in accordance with some embodiments.

Approaches for aligning a light source with a heat assisted magnetic recording (HAMR) slider based light emerging from the air bearing surface (ABS) of the slider is described. The approaches use a cross-polarization detection scheme that rejects stray light and illumination background and can be used to enhance fabrication of a HAMR slider.

As the magnetic grain size is reduced to increase the storage density in a magnetic storage media, the grains become superparamagnetic, causing their magnetic state to become thermally unstable and the magnetized grains to gradually lose a particular magnetic state over time. Materials with a large magnetic anisotropy can support smaller grains and larger storage densities. However, the coercivity of high-anisotropy materials is greater than the magnetic field that can be generated by a recording head.

Heat assisted magnetic recording (HAMR) and the like in optical recording overcomes this problem by localized heating of the storage media to reduce its coercivity while data is being magnetically stored in the media. Optical energy must be efficiently delivered and confined to a spot in the medium that is much smaller than the diffraction limit so that neighboring tracks are not heated. Heating and cooling of the medium must occur within about 1 nanosecond (ns) of less in order to achieve the necessary data rates, to generate a large thermal gradient for sharp bit edge definition, and to ensure that the recorded data are thermally stable during cooling to ambient. Heating the media at the precise point that the data is stored, such as by selectively directing electromagnetic energy from a laser to the media, temporarily reduces the magnetic anisotropy of the media. After cooling, the magnetic anisotropy returns to the relatively high value to stabilize the stored magnetic state.

The tiny and confined optical spot needed for HAMR can be achieved by employing a near field transducer (NFT) that converts electromagnetic radiation to surface plasmons. The NFT is a near-field optics device designed to reach local surface plasmon conditions at a designed wavelength. A waveguide and/or other optical element concentrates light on a transducer region (e.g., focal region) near which the NFT is located. The NFT is designed to achieve surface plasmon resonance in response to this concentration of light. At resonance, a high electric field surrounds the NFT due to the collective oscillations of electrons at the metal surface. Part of this field will tunnel into a storage medium and get absorbed, thereby raising the temperature of a spot on the media as it being recorded.

A light source, such as a laser diode, is deployed on or in a slider to generate light that is conveyed along a light delivery path to the NFT. In some configurations, the laser light may be directed along the light delivery path to the NFT by a waveguide input coupler and/or one or more mirrors. It can be helpful to limit the number of mirrors in the light path and/or to shorten the propagation distance for greater light delivery efficiency. The mirrors and waveguide input coupler are part of the light delivery path that delivers light from the laser diode to the NFT. In some implementations, the light delivery path uses three-mirrors and a waveguide input coupler that couples light into the light delivery path is about 100 μm to 350 μm offset from the center of the slider. Other slider implementations use a straight-through light path. Some embodiments use only one mirror, e.g., a solid immersion mirror (SIM) that collects and focuses the light on the NFT. In straight through embodiments, the waveguide input coupler and NFT may be arranged along the center of the slider. Some embodiments use a three-dimensional channel waveguide all the way to ABS for light delivery and a NFT is placed near the end of the waveguide.

With a short propagation distance, stray light, e.g., light that is not coupled into the waveguide or scattered out of the waveguide, may not have enough propagation distance to radiate out of the slider before reaching the ABS (air-bearing surface). In embodiments that employ a SIM, for example, at least part of the stray light can be collected by the SIM, due to its entrance opening width, e.g. between about 10 and 100 μm. The stray light may cause dual-peak, multiple-peak, and/or broad peak light in the far-field transmission. Alignment of the light source output with the waveguide input coupler may seek to provide optimal optical coupling into the waveguide input coupler. The dual-peak, multiple-peak, and/or broad peak light complicate alignment of the light source with the waveguide input coupler.

The above-mentioned alignment may be used during manufacturing to align the laser with the slider (which includes the input coupler) before they are bonded together. For example, the light source, e.g., laser diode may be placed on a mounting region of the slider and energized to cause the laser diode to illuminate the light delivery path of the slider. An alignment between the laser diode module and the slider can be determined based on light emitted from the slider ABS.

FIG. 1A illustrates an apparatus 100 useful for aligning a light source 110 with a slider 120 to provide optimal light coupling into a waveguide input coupler 125 in accordance with some embodiments. The waveguide input coupler 125 couples light into a light delivery path 188 within the slider 120. The light delivery path 188 carries light from the waveguide input coupler 125 to an NFT 150. The light delivery path 188 depicted in FIG. 1A is defined at least by waveguide input coupler 125 and solid immersion mirror (SIM) 160. The apparatus 100 may include an alignment mechanism comprising a fixture 140 that can be operated by a controller 185. The fixture 140 is configured to hold the light source, e.g., laser diode 110 (which may be disposed in or on submount 111) relative to a mounting region 121 of a heat assisted magnetic recording slider 120. The fixture 140 can be operated to move the light source 110 relative to the mounting surface 121 along the x (cross-track), y (down-track) and/or z (gap) directions. For example, the fixture 140 can be operated to move the light source 110 to position coordinates that provide optimal optical coupling between the output of the light source 110 and the waveguide input coupler 125. According to embodiments discussed herein, a point of optimal optical coupling can be determined from light that emerges from the ABS 122 of the slider 120.

A portion of the light from the light source is coupled into the waveguide input coupler 125 and is not scattered out of the light delivery path, traversing the light delivery path to be absorbed by and excite the NFT. This light is polarized in a transverse (i.e., xz plane) electric (TE) or transverse magnetic (TM) mode. At the focal point of SIM, for example, with reference to FIG. 1A, at NFT 150, the light in the SIM 160 has a polarization longitudinally along the axis of symmetry of SIM 160, where the longitudinal polarization state is indicated by double arrow 193. The polarized electric field of this light at the focal point couples strongly to the NFT 150, exciting the NFT 150 and creating surface plasmonic resonance. The excitation of the NFT 150 radiates light that has a component polarized in a state that is orthogonal to the polarization state of the excitation light, where the polarization state of this component of light emitted to far-field due to optical excitement of the NFT is along the y direction as the incident waves are TE polarized parallel to xz plane.

When the light source 110 is energized, at least a portion of the laser light emitted by the light source 110 optically couples into the light delivery path through the waveguide input coupler 125. Depending on the alignment of the light source 110 with the waveguide input coupler 125, a portion of the laser light may not couple into the waveguide input coupler 125, as indicated by arrows 191. A portion of the light that couples into the waveguide input coupler 125 may be scattered out of the light delivery path at one or more points along the light delivery path, as indicated by arrows 192. Light that travels in the slider and does not couple into the waveguide input coupler and/or that scatters out of the light delivery path is referred to herein as "stray light."

Stray light may illuminate the NFT (e.g., may be focused toward the NFT by a SIM) but does not substantially contribute to excitation of the NFT. The stray light is divergent and is not focused well by the SIM and onto the NFT. Light exiting from slider includes three types: excitation light, also referred to herein as "illumination background", stray light, and NFT radiation.)

Light source-slider alignment approaches described herein are based on detecting light having a first polarization state that is generated by optical excitation of the NFT and rejecting light having a polarization state orthogonal to the first polarization state. Light having the polarization state orthogonal to the first polarization is included, for example, in stray light, as previously discussed, and/or in light from the light source that is coupled into the light delivery path, is not scattered out of the light delivery path, and is not absorbed by the NFT, referred to herein as "excitation light" or "illumination background."

Rejection of the stray light and illumination background is achieved using a polarizing filter 177, e.g., linear polarizer, having an optical axis that is rotated to substantially transmit the light having the first polarized state that is emitted from the NFT 150 and emerges from the ABS 122 and to substantially eliminate light having a polarization state orthogonal to the first polarization state. Thus, the polarizing filter rejects a substantial portion of the stray light and illumination background that emerges from the ABS. The technique of detecting light emitted by the NFT 150 and having a first polarization state while rejecting light having the orthogonally polarized state is referred to herein as a "cross-polarization" detection scheme. The cross-polarization detection scheme rejects the illumination background and stray light and detects the NFT radiation in far-field. The cross-polarization detection scheme can be used during slider assembly to reject stray light/or increase the signal to noise ratio of the alignment feedback signal, thereby facilitating accurate alignment of the light source with the slider.

Light emerging from the ABS 122 may be collected using an objective lens 171 with a high numerical aperture (NA). For example, in some embodiments, the objective lens may be dry with an NA of 0.80. In some embodiments the emerging light is collected using a lens having a numerical aperture (NA) greater than 1.25, wherein NA=n sin θ, n is the index of refraction of the medium in which the lens is working (1.0 for air), and θ is the half-angle of the maximum cone of light that can enter or exit the lens.

Figure 1B:
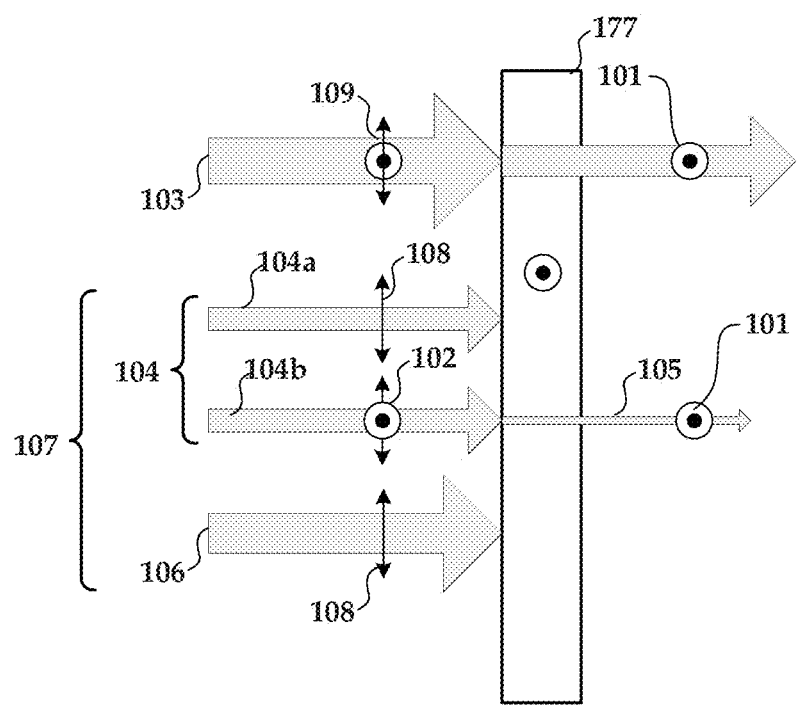
FIG. 1B illustrates a polarizing filter.

FIG. 1B diagrammatically illustrates operation of the polarizing filter 177 with respect to the light that emerges from the ABS. As previously discussed, a first portion of light 103 that emerges from the ABS is emitted by the NFT in response to optical excitation by the laser light. The first portion of light 103 has many uncorrelated polarization states 109 including light having a polarization state 101 aligned with the polarization axis of the polarizing filter 177.

A second portion of light 107 may include several components. The second portion 107 comprises stray light 104 that includes one or both of light 104a that does not couple into the waveguide input coupler and light 104b that couples into the waveguide input coupler but is scattered out of the light delivery path before reaching the NFT. The stray light 104a is substantially polarized with polarization state 108 and the stray light 104b is unpolarized 102 and is of weak intensity. The second portion of light 107 also includes the illumination background 106 that may be substantially polarized having a polarization state 108 orthogonal to the optical axis of the filter 177. The polarizing filter 177 transmits the portion of light emitted by the NFT that has a polarization state 101 that corresponds to the polarization axis of the filter 177. The polarizing filter 177 transmits a fraction of the stray light 105 from 104b, and rejects the majority of the stray light 104a. The illumination background, having a polarization state orthogonal to the polarization axis of the optical filter, is substantially rejected by the filter 177.

Returning now to FIG. 1A, a detector 180, which may be a non-imaging detector such as a photodetector or an imaging detector such as a charge coupled device (CCD), detects the light transmitted through the polarizing filter and generates an electrical signal carried by connection 181 to alignment controller 185. In some configurations, an iris may be inserted before the detector 180 to increase the signal-to-noise ratio (SNR) by rejecting the remaining stray light such as 104b. The alignment controller is electrically coupled to the fixture 140 and can be configured and/or programmed to cause the fixture 140 to move the light source 110 in one or more of x, y and z directions. The functionality of the controller 185 may be implemented in hardware, software, or a combination thereof. For example, the controller 185 may include a processor that implements software instructions to perform various processes described herein, e.g., such as some of the processes illustrated in the flow diagrams. In some implementations, the fixture 140 may comprise one or more piezoelectric actuators that are controllable to move the light source 110 in one or more directions. The electric signal generated by the detector 180 can serve as a feedback signal by the alignment controller 185 to facilitate alignment of the light source 110 with the waveguide input coupler 125.

Figure 1C:
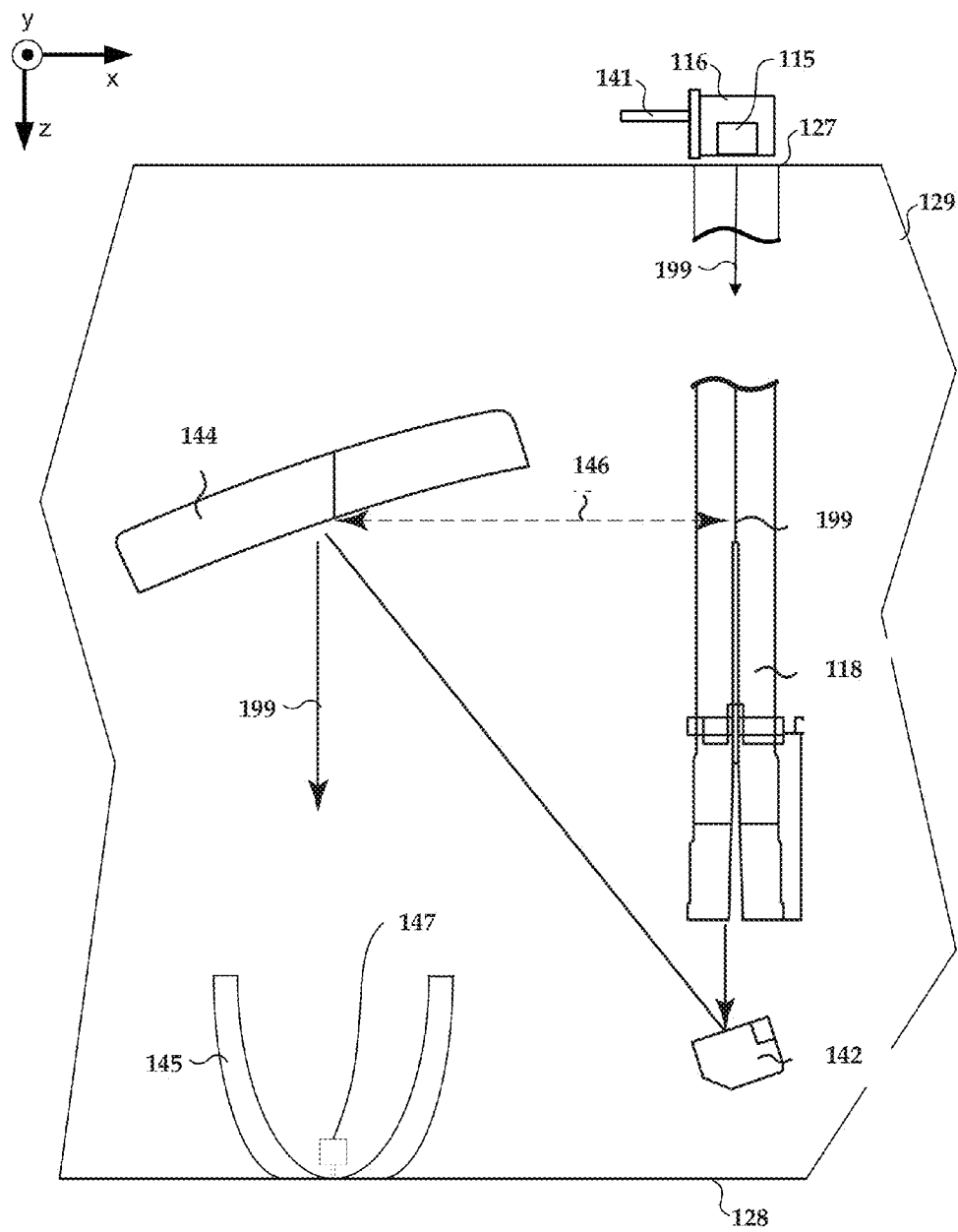
FIG. 1C is a block diagram of another embodiment of an alignment apparatus showing a slider having a three-mirror arrangement in accordance with some embodiments.

The apparatus 100 of FIG. 1A depicts a portion of a slider that includes a straight through light delivery path configuration, employing only one mirror, SIM 160. In this configuration, the light source 110 and the NFT 150 may be disposed along a center line of the slider. FIG. 1C illustrates a slider having different light delivery path arrangement. In the configuration of FIG. 1C, the light delivery path includes three mirrors, two directional mirrors 142, 144 and the SIM 145. The NFT 147 is offset from the waveguide input coupler 118 along the x axis by a distance, e.g., about 102 micrometers (μm). Light path 199 passes through waveguide input coupler 118 to a first reflecting mirror 142. Light reflected by mirror 142 encounters a second reflecting mirror 142 which redirects the light 199 toward SIM 145 which focuses the light on the NFT 147.

FIG. 1C shows the light source, comprising light source 110, arranged in or on a module 111 and positioned at a mounting surface 127 of the slider 162. Although not shown in FIG. 1C, light emitted from the ABS 128 can be collected, filtered, and detected using a lens 172, polarizing filter 177, and detector 180 as previously discussed in connection with FIG. 1A. The electrical signal generated by the detector 180 can be used to adjust the alignment of the light source 115 relative to the NFT 147.

Figure 1D:
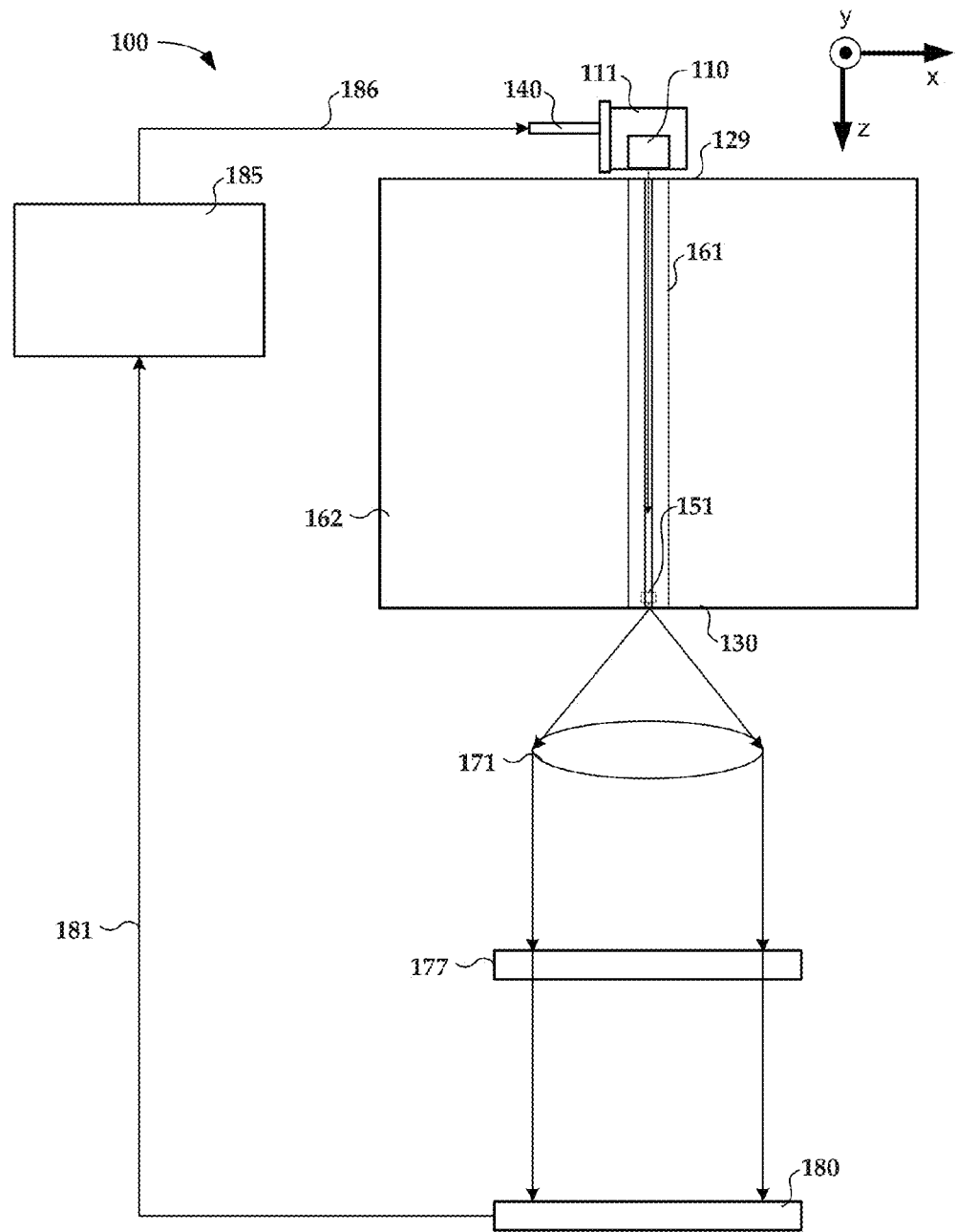
FIG. 1D is a block diagram of another embodiment of an alignment apparatus showing a slider that includes a waveguide that extends to the air bearing surface with the near field transducer positioned near the ABS.

FIG. 1D illustrates the alignment apparatus 100 of FIG. 1A, used with slider 162. Slider 162 is similar in some respects to the slider 120 of FIG. 1A, except that slider does not include a SIM and includes a waveguide 161 that extends to the ABS 130 and is proximate to an NFT 151.

Figure 2:
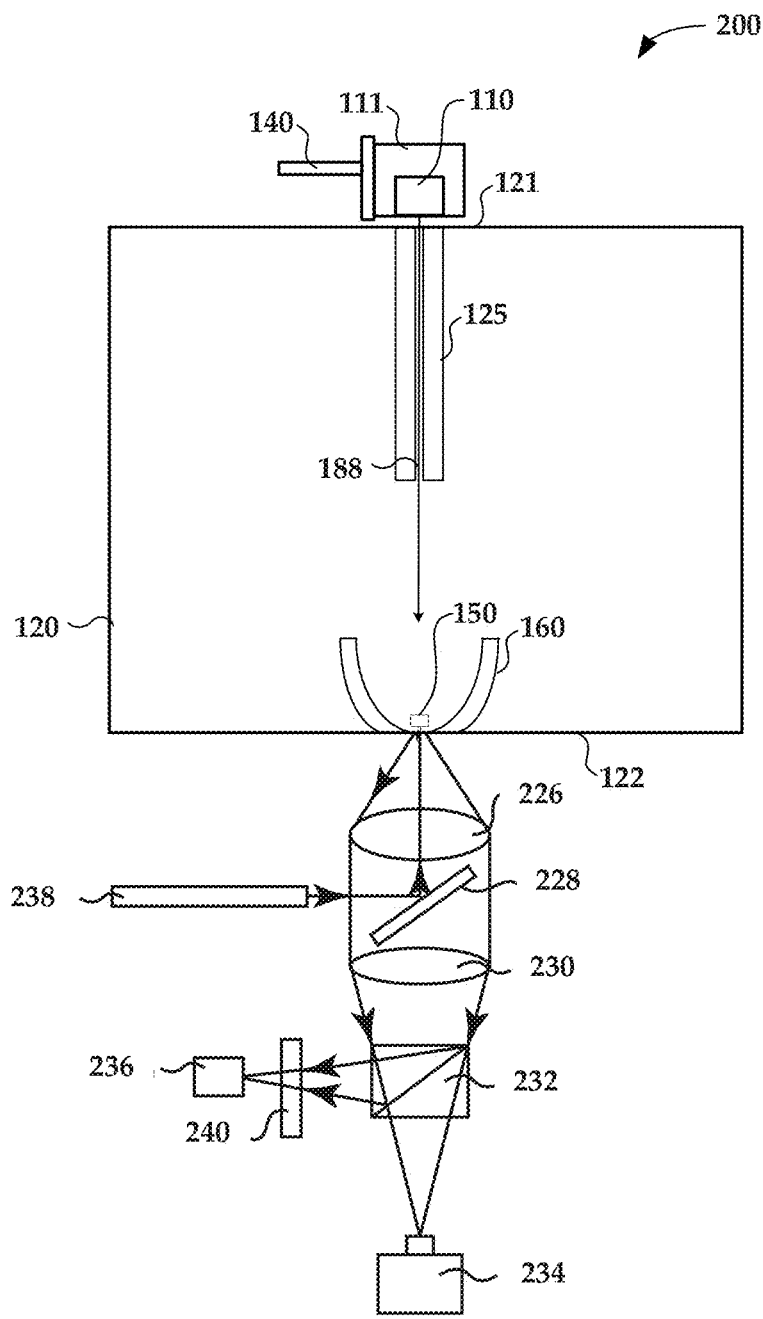
FIG. 2 illustrates an alignment apparatus in accordance with some embodiments.

FIG. 2 depicts another optional embodiment of an alignment apparatus 200 that includes optical components that allow for viewing and/or imaging the surface of the ABS when the light source is not energized and also viewing and/or imaging the light spot at the ABS when light source is energized. Viewing and/or imaging the ABS surface with the light source energized can be used for visual preliminary alignment between the light source 110 and waveguide input coupler 125. FIG. 2 depicts waveguide input coupler 125 that couples light emitted from the light source, e.g., laser diode 110 into a light delivery path 188 within the slider 120. The light delivery path 188 carries light from the output of the light source 110 to a focal point near NFT 150. The light delivery path 188 depicted in FIG. 2 is defined at least by the waveguide input coupler 125 and SIM 160. The alignment apparatus 200 includes a fixture 140 configured to hold the light source 110 (which may be disposed in or on submount 111) relative to a mounting region 121 of the slider 120. The fixture 140 is operable to move the light source 110 relative to the mounting surface 121 along the x (cross-track), y (down-track) and/or z (gap) directions. For example, in some implementations, the fixture 140 can be operated to move the light source 110 to a position of optimal optical coupling between the output of the light source 110 and the waveguide input coupler 125. According to some embodiments discussed herein, the coordinates of the position of optimal optical coupling can be determined from light that emerges from the ABS 122 of the slider 120.

Light emerging from the ABS of slider 120 may include illumination background, stray light, and/or light emitted by the NFT due to excitation of the NFT. The light is collected by objective lens 226 and is imaged onto a charge coupled device (CCD) 234 through a beamsplitter 232 by focusing lens 230. The CCD provides an image of the ABS and optical spot in the field of view of the objective lens 226. A portion of the light is directed by a beamsplitter 232 to a polarizing filter 240 having an optical axis that is rotated to substantially reject the stray light and illumination background and to transmit portion of light radiated by the NFT and polarized orthogonal to the illumination background. Light transmitted through the polarizing filter 240 is detected by detector 236 which generates an electrical signal in response to the detected light. The electrical signal may be used, e.g., by a controller (not shown in FIG. 2), to operate the fixture 140 to align the light source 110 with the input coupler 125. To facilitate viewing the surface of the ABS a fiber light source 238 is arranged to provide light that is directed towards the ABS surface by a beamsplitter or a dichroic mirror 228.

Figure 3:
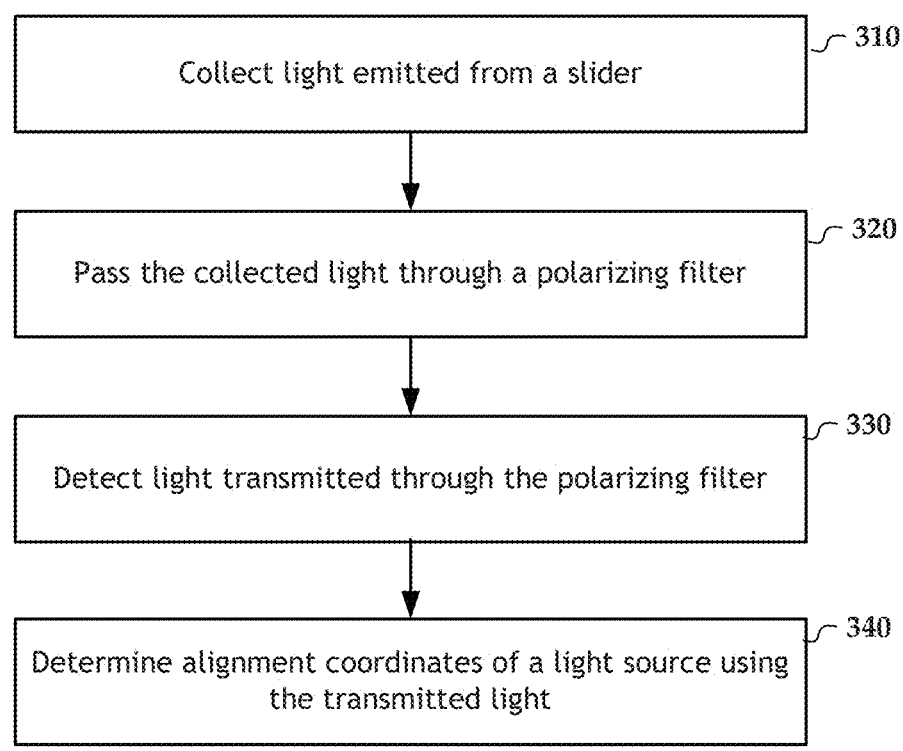
FIGS. 3-5 are flow diagrams illustrating processes that may be implemented by the alignment apparatuses according to various embodiments.

Embodiments described in this disclosure involve methods for determining the coordinates of optimal alignment for the light source on the slider and/or aligning the light source with the waveguide input coupler of the light delivery path at coordinates that provide optimal alignment. One or more of the processes depicted by the flow diagrams of FIGS. 3 through 5 may be implemented by controller, e.g., controller 185 shown in FIG. 1A. FIG. 3 provides a flow diagram of a method for determining alignment in accordance with some embodiments. Light that emerges from an ABS of a heat assisted magnetic recording slider is collected 310. The light that emerges from the ABS includes a first portion of light emitted due to excitation of the NFT and having a component of a first polarization state. The light that emerges from the ABS includes a second portion of light that includes polarization directions different from the first polarization direction. The collected light is passed 320 through a polarizing filter. The polarizing filter is arranged to substantially transmit light having the first polarization state emitted from NFT and to substantially reject stray light and illumination background having a polarization state orthogonal to the first polarization direction. The light transmitted by the polarizing filter is detected 330 and is used to determine 340 coordinates for aligning the light source with the slider.

Figure 4:
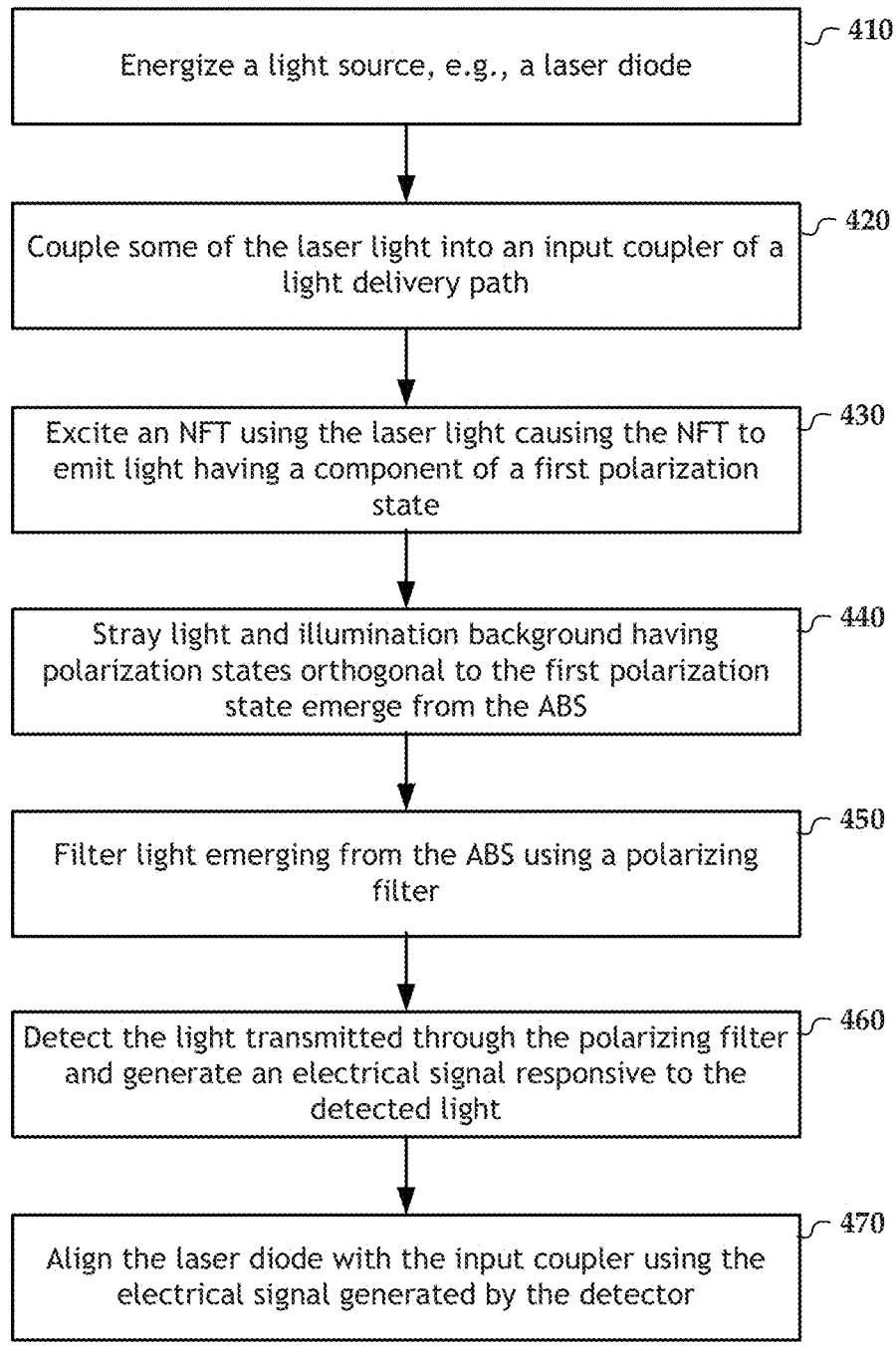

The flow diagram of FIG. 4 depicts an alignment method according to some embodiments. The method includes energizing 410 a light source, e.g., laser diode, positioned relative to a mounting surface of a slider. The energized laser diode produces light, some of the laser light coupling 420 into a light delivery path through a waveguide input coupler. A portion of the light coupled into the light delivery path propagates through the light delivery path to excite 430 an NFT, causing the NFT to emit light having a component of a first polarization state. The light generated by the NFT having the first polarization state emerges through the ABS of the slider. Stray light and illumination background also emerge 440 from the ABS, the stray light and illumination background having polarization states orthogonal to the first polarization state. The light emitted from the ABS is passed 450 through a polarizing filter that substantially transmits light having the first polarization state and substantially rejects light having a polarization state orthogonal to the first polarization state.

The light transmitted through the polarizing filter is detected 460 by a detector which generates an electrical signal responsive to the detected light. The position of the light source can be adjusted 470 to optimally align the light source output with the waveguide input coupler using the electrical signal.

Figure 5:
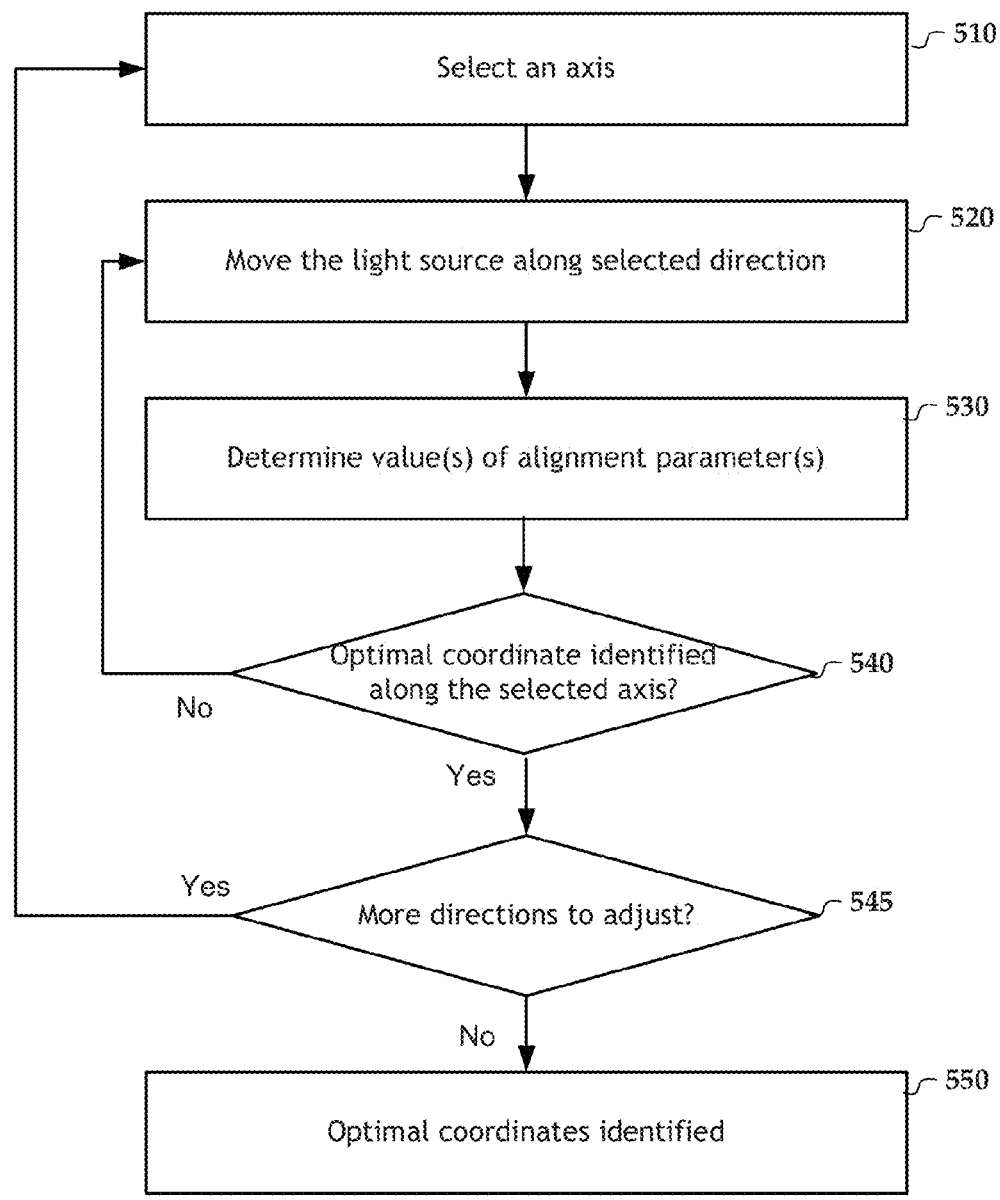

FIG. 5 is a flow diagram illustrating a process for determining coordinates for alignment of the light source that may be implemented by a controller, for example, by controller 185 shown in FIG. 1A. An initial axis (e.g., cross-track or down-track) is selected 510 for determination of the alignment coordinate. One or more parameters of the electrical signal can be used to determine alignment of the light source. As the position of the light source is moved 520 along the selected axis, the values of the one or more alignment parameters are determined 530. The optimal coordinate of the light source along the selected axis is identified 540 when the values of the one or more alignment parameters satisfy predetermined alignment criteria. The process continues until 545, 550 the optimal alignment coordinates are identified along each axis. After the optimal alignment coordinates are determined, the light source may be affixed to the slider at the optimal coordinates.

For example, in some implementations, the alignment criteria may comprise a maximum value of the electrical signal. The light source is moved along the selected axis until a maximum value of the electrical signal is detected. In this implementation, the maximum value of the electrical signal satisfies the alignment criteria. The coordinate corresponding to the maximum value is used as the optimal alignment position along the selected axis. In another embodiment, the alignment criteria are satisfied when the signal is greater than a predetermined threshold.

In some embodiments, the light source is scanned (moved) through multiple positions along the selected axis and the amplitude of the electrical signal at each of the multiple positions is measured. The full width half maximum (FWHM) of the amplitude vs. position signal can be determined. The optimal coordinate is identified as a position corresponding to the peak signal value or to a position corresponding to the FWHM of the signal. In some implementations, the optimal alignment position of the light source is determined to be the mid-point of the width of the signal at FWHM. Iterating to achieve the optimal position along each of the selected axes may be employed.

The effectiveness of cross-polarization detection scheme in rejecting stray light is demonstrated in FIGS. 6-8. In these experiments, the alignment apparatus as shown in FIG. 3 was used with a laser diode attached to a fixture comprising a three-axis piezoelectric stage. The laser diode was translated along both the x-direction (cross-track) and the y-direction (down-track) at a given z-gap (the distance of laser diode facet from the top of the slider). A photodetector was used to provide far field light output at various x, y and z positions. Measurements were taken of the light emerging from the slider with and without the polarizing filter inserted before the detector. In this discussion, measurements taken with the polarizing filter inserted are referred to as "polarized" measurements and measurements taken without the polarizing filter inserted are referred to as "unpolarized." The polarized measurements had the stray light and illumination background removed by the polarizer. To confirm the alignment between the laser diode and slider, near-field measurement was also conducted with a scanning near-field optical microscope (SNOM), which scans an aperture probe in contact mode over the ABS and detects the light intensity transmitted through the aperture. The aperture size is usually 100-150 nm. Far-field (FF) measurements were obtained by a photodetector (see FIG. 2) at z-gap=1-3 µm, while near-field intensity was obtained by SNOM at nearly contact (z-gap=0) unless specifically mentioned. In FIGS. 6C, 7C, 8C, and 8E, $\Delta x$ refers to the offset of laser diode in the x direction from the position determined by the cross-polarization detection scheme (using a polarization filter) as its optimal (peak) position.

The results when testing first, second, and third slider devices are shown in FIGS. 6, 7, and 8, respectively. FIGS. 6A through 6D provide the results of testing a first three-mirror laser on slider arrangement similar to the arrangement shown in FIG. 1C. FIG. 6A shows profiles of measured far-field intensity as a function of laser diode position without polarization filter. FIG. 6B shows the profiles of intensity as function of laser diode position with polarization filter. FIG. 6C depicts profiles of near-field intensity at the air bearing surface (ABS) as the laser diode is positioned at $\Delta x=0$, $-2$, and $+2$ micrometers (µm), where each frame of FIG. 6C is 2 µm×2 µm. FIG. 6D shows a graph of the peak near-field intensity as a function of $\Delta x$ after optimal position ($\Delta x=0$) alignment of the laser diode using cross-polarization detection. It can be seen in FIG. 6A that, without the polarization filter, the far-field intensity profile along cross-track direction had one main peak with two shoulders on the right. The peak width at full-width-at-half-maximum intensity (FWHM) in the cross track direction was about 7.5 µm and the peak width at FWHM in the down track direction was 2.08 µm. Using a cross-polarization detection, the peak width was reduced significantly, from 7.5 µm to 4.5 µm in cross-track direction, and from 2.08 µm to 1.77 µm in down-track direction, as shown in FIG. 6B. These results were consistent with those observed by modeling when stray light was not taken into account. As shown in FIG. 6C, the near-field intensity was maximized at $\Delta x=0$. FIG. 6C shows near-field intensity measurements at $\Delta x=0$, $-2$ µm, and $+2$ µm obtained with SNOM after alignment using cross-polarization ($\Delta x=0$) and at the positions $\Delta x=-2$ µm, and $\Delta x=+2$ µm. The images shown in FIG. 6C are reversed gray scale with the background showing white instead of black, the more intense light showing black and the less intense light showing gray. As seen in FIG. 6C, the intensity was greatest at $\Delta x=0$, the optimal x position determined by the cross-polarization analysis. This study supports the use of cross-polarization detection for laser diode alignment. FIG. 6D is a graph of the near-field peak pixel count versus cross-track $\Delta x$ after alignment of the laser diode using cross-polarization detection. The graph is consistent with the images of FIG. 6C and supports the efficacy of the cross polarization alignment scheme, showing the maximum peak pixel count occurring near $\Delta x=0$.

Figure 7A:
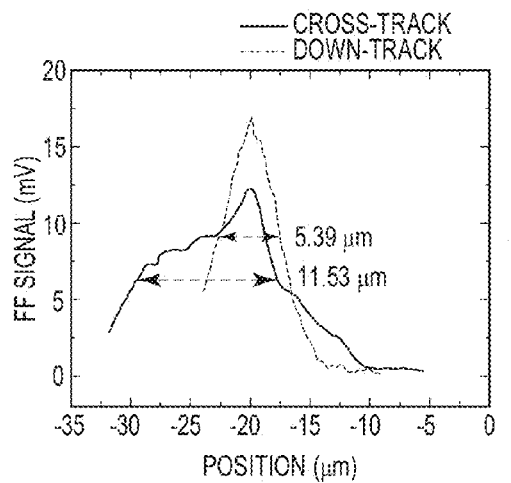
FIGS. 7A-7D provide results of testing a second three-mirror light on slider arrangement with FIG. 7A showing profiles of far-field intensity as a function of diode position without a polarization filter, FIG. 7B showing the same with a polarization filter, FIG. 7C depicting profiles of near-field intensity at the air bearing surface (ABS) at $\Delta x=0$, $-2$, and $+2$ $\mu m$ after alignment with polarization filter, and FIG. 7D showing a graph of the near-field photon count versus cross-track $\Delta x$ after alignment with polarization filter.
Figure 7B:
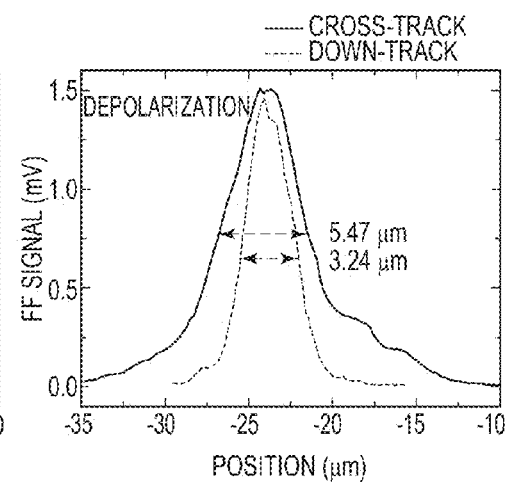
Figure 7C:
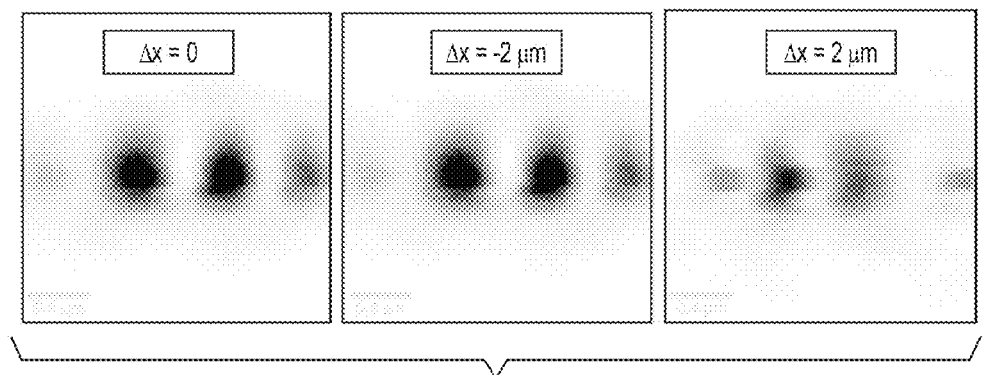
Figure 7D:
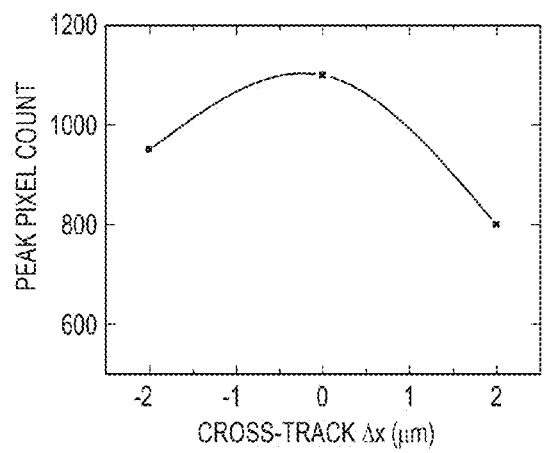

The second slider tested had only half of the far-field intensity of the first device. FIG. 7 is a depiction of the results of testing a second three-mirror laser on slider arrangement. FIG. 7A shows profiles of cross track and down track far-field intensity as a function of diode position without a polarization filter; FIG. 7B shows cross track and down track far-field intensity as a function of diode position with a polarization filter; FIG. 7C depicts profiles of near-field intensity at the air bearing surface (ABS) at $\Delta x=0$, $-2$, and $+2$ µm after cross-polarization alignment at $\Delta x=0$; and FIG. 7D shows a graph of the near-field peak pixel count versus cross-track $\Delta x$ after cross-polarization alignment of the laser diode. As seen in FIG. 7A, the cross-track intensity profile without cross-polarization detection was quite broad, FWHM=11.5 µm and the down-track intensity profile without cross-polarization detection was also broad. With the cross-polarization detection as shown in FIG. 4B, the peak width drops to 5.5 µm in the cross-track direction, and 3.2 µm in the down-track direction. Once again, the near-field measurement with a SNOM imaging in FIG. 7C and the graph shown in FIG. 7D of the near-field peak intensity versus cross-track $\Delta x$ after cross-polarization alignment confirmed the alignment done by cross-polarization detection was optimal. As above, the picture is a reversed gray scale image with the background showing white instead of black, the more intense light showing black and the less intense light showing gray.

Figure 8A:
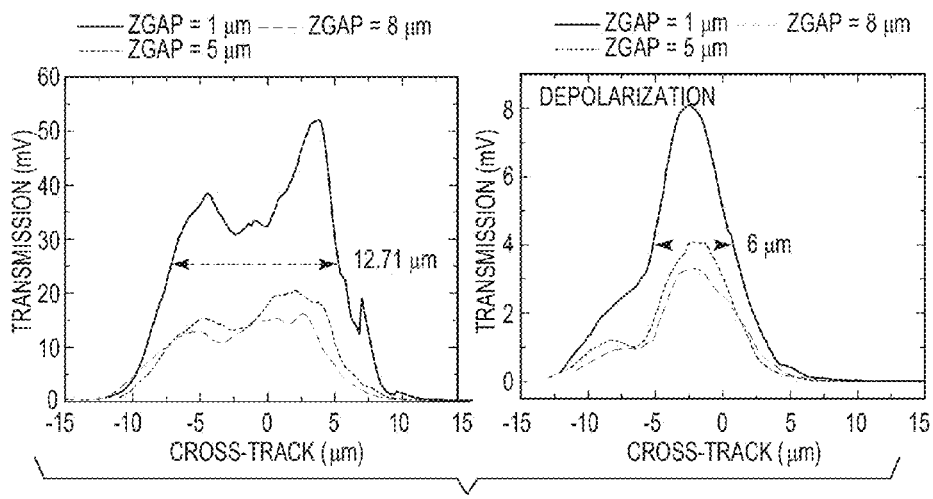
FIGS. 8A-8E provide the results of testing a third three-mirror light on slider arrangement with FIG. 8A showing profiles of far-field intensity for z-gap=1, 5, and 8 $\mu m$ as a function of diode position without a polarization filter, FIG. 8B showing the same with a polarization filter, FIG. 8C depicting profiles of near-field intensity at the air bearing surface (ABS) at $\Delta x=0$, $-2$, and $+2$ $\mu m$ after cross alignment with a polarization filter for z-gap of 1 $\mu m$, FIG. 8D showing a graph of the near-field intensity versus cross-track $\Delta x$ after alignment with a polarization filter for z-gap of 0 $\mu m$, and FIG. 8E depicting profiles of near-field intensity at the air bearing surface (ABS) at $\Delta x=0$, $-2$, and $+2$ $\mu m$ after alignment with a polarization filter for z-gap of 5 $\mu m$.
Figure 8B:
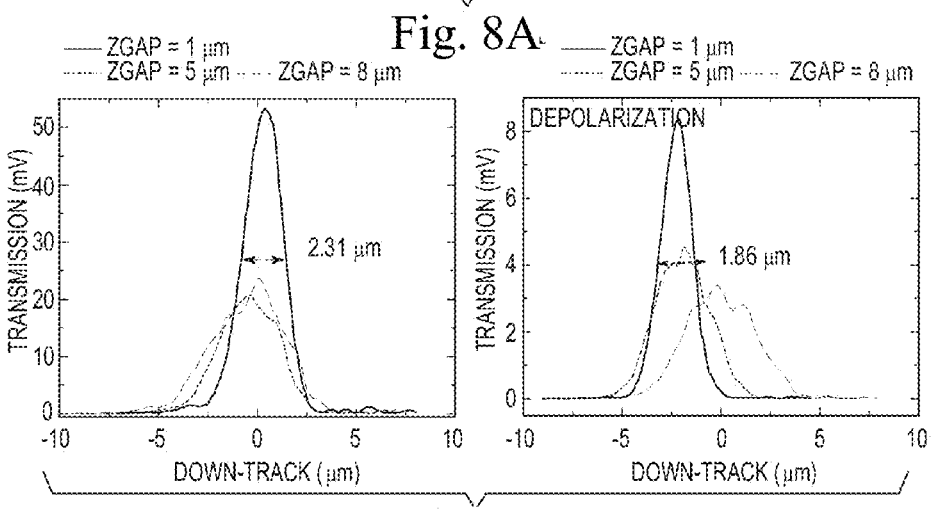
Figure 8C:
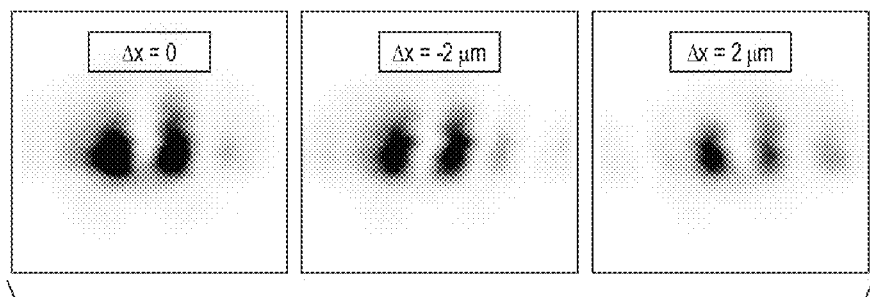
Figure 8D:
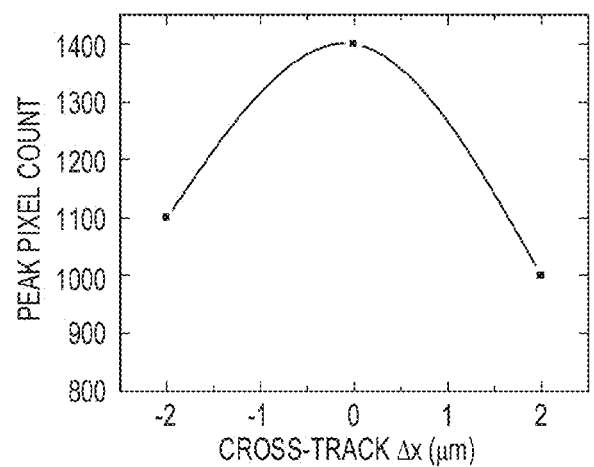
Figure 8E:
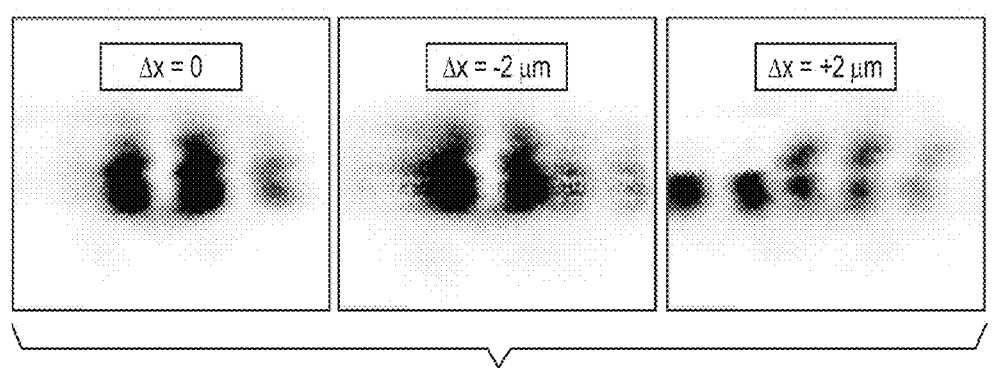

The third device had the strongest far-field transmission among the three devices. FIG. 8 is a depiction of the results of testing a third three-mirror laser on slider arrangement with FIG. 8A showing profiles of far-field intensity for z-gap=1, 5, and 8 µm as a function of laser diode position without a polarization filter; FIG. 8B showing the same with a polarization filter; FIG. 8C depicting profiles of near-field intensity at the air bearing surface (ABS) at $\Delta x=0$, $-2$, and $+2$ µm after cross-polarization alignment for z-gap of 1 µm, FIG. 8D showing a graph of the near-field photon count versus cross-track $\Delta x$ after cross-polarization alignment for z-gap of 0 µm, and FIG. 8E depicting profiles of near-field intensity at the air bearing surface (ABS) at $\Delta x=0$, $-2$, and $+2$ µm after cross-polarization alignment for z-gap of 5 µm. FIG. 8A shows two peaks in the far-field cross-track scan for all three z-gaps with transmission intensity decreasing as the z-gap increased and the FWHM reaching a high of 12.7 µm at z-gap=1 µm. With the cross-polarization detection shown in FIG. 8B, the far-field signal became a single peak at the all three z-gaps studied. At z-gap=1 µm, the cross-track peak FWHM was reduced to 6 µm using cross-polarization detection. In down-track direction, the peak width was also reduced from 2.31 µm to 1.86 µm at a z-gap of 1 µm. As seen from near-field measurement with a SNOM shown in FIG. 8C and the graph of FIG. 8D of the near-field peak intensity versus cross-track $\Delta x$ at a z-gap of 1 µm after alignment with a polarization filter confirmed the alignment performed using the polarization filter. As discussed above, the picture is a reversed gray scale image with the background showing white instead of black, the more intense light showing black and the less intense light showing gray. FIG. 8E depicts near-field measurement with a SNOM at a z-gap of 5 µm after alignment with a polarization filter that confirmed the alignment done using a polarization filter was optimal for the z-gap used.

Laser diode alignment based on a cross-polarization detection described herein involves rejecting stray light effectively in the far-field detection, providing a convenient approach for determining an optimal position of the laser diode relative to the waveguide input coupler of the slider. Near-field measurements discussed above confirm the laser diode positioning using cross-polarization detection. Cross polarization detection can be reliably used to generate a feedback signal assembling heat assisted magnetic recording sliders having a laser diode disposed thereon.

Some embodiments involve an apparatus for performing the alignment of the laser diode module with the NFT in the slide assembly. These embodiments are not meant to be restrictive to only the apparatus disclosed, but encompass other embodiments that perform the same or similar functions. Some embodiments include three elements, a fixture, an optical polarizing filter, and a light detector. The fixture is configured to hold a laser diode module on a mounting region of a heat assisted magnetic recording slider having a near field transducer. The fixture is operable to move the laser diode relative to the mounting surface in one or more dimensions. The polarizing filter is arranged to receive light emitted from the slider. A portion of the light is emitted from the slider by a near field transducer and has a component of a first polarity, and another portion of the light is emitted from the slider as stray light and illumination background is polarized orthogonal to the first polarity. The polarizing filter substantially transmits the portion of the light having the first polarity and substantially rejects the light that has a polarity orthogonal to the first polarity. The photodetector is configured to detect light transmitted by the polarizing filter and to generate an electrical signal in response to the detected light.

In some embodiments, the slider comprises a solid immersion mirror configured to focus light on a plasmonic antenna. In some embodiments, the slider comprises a three-dimensional channel waveguide all the way to/near ABS and light delivery to a plasmonic antenna. Depending on the length of the light path between the laser diode and the NFT, the stray light comprising light that is not coupled into the light delivery path via the waveguide input coupler or that is scattered out of the light delivery path may not have enough propagation distance to radiate out of the slider before reaching the ABS.

Some embodiments involve a controller coupled to the fixture an alignment mechanism configured to allow movement of the laser diode relative to the slider. Movement may be allowed for one or more of the cross-track direction, the down-track direction, and the gap direction as discussed above. Often the direction most sensitive to stray light confusion is the cross direction. Thus, some embodiments may comprise an alignment mechanism configured to allow movement of the laser diode relative to the slider is just the cross-track direction with the light source-slider gap held to a minimum.

In some embodiments the alignment mechanism comprises a controller configured to receive the electrical signal and to operate a fixture that moves the laser diode module relative to the slider based on the electrical signal. In some embodiments the controller is configured to process the electrical signal generated as the laser diode is moved relative to the slider surface and to determine whether criteria for optimal laser diode alignment have been satisfied.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method, comprising:
   collecting light emerging from an air bearing surface (ABS) of a heat assisted magnetic recording slider, a first portion of the light emitted by a near field transducer in response to optical excitation by a first light source and having a component of a first polarization state, a second portion of the light including at least one of stray light and illumination background, the second portion of light comprising polarization states different from the first polarization state;
   illuminating the ABS with light from a second light source external to the slider and directed toward the ABS;
   filtering light emerging from the ABS using a polarizing filter, the polarizing filter substantially transmitting light having the first polarization state and substantially rejecting light having a polarization state orthogonal to the first polarization state;
   detecting the rejected light;
   forming an image of the ABS based on the rejected light;
   detecting light transmitted through the polarizing filter;
   generating an electrical signal in response to detecting the transmitted light, the electrical signal comprising amplitude as a function of position along a mounting surface of the slider; and
   determining alignment coordinates of the first light source based on the signal by measuring values of one or more signal parameters for multiple positions of the mounting surface and identifying a position of the light source in x, y, and z coordinates that satisfy alignment criteria by comparing a value of a signal parameter to a threshold value and identifying the position in response to the value of the signal parameter exceeding the threshold value.

2. The method of claim 1, wherein the stray light includes one or both of light that is not coupled into a waveguide input coupler and light that is scattered out of the waveguide input coupler.

3. The method of claim 1, wherein the second portion of light includes the illumination background that is coupled into the waveguide input coupler and is not scattered out of the waveguide input coupler or absorbed in the slider.

4. The method of claim 1, further comprising:
   aligning the first light source using the alignment coordinates; and
   attaching the first light source after the aligning.

5. The method of claim 1, wherein identifying the position that satisfies the alignment criteria comprises identifying the position associated with a maximum full width half maximum value.

6. The method of claim 1, further comprising aligning the first light source relative to the slider at the coordinates.

7. The method of claim 1, wherein:
   collecting the light emerging from the air bearing surface of the slider comprises collecting the emerging light using a lens; and
   further comprising focusing the collected light on the polarizing filter.

8. An apparatus, comprising:
   polarizing filter configured to filter light emerging from an air bearing surface (ABS) of a heat assisted magnetic recording slider, the light emerging from the ABS including light emitted by a near field transducer in response to optical excitation and having a component of a first polarization state, a second portion of the light including at least one of stray light and illumination background, the second portion of light comprising polarization states different from the first polarization state, the polarizing filter configured to substantially transmit light having the first polarization state and to substantially reject light having a polarization state orthogonal to the first polarization state;
a first detector arranged to detect light transmitted through the polarizing filter and to generate an electrical signal in response to detected light;
a light source alignment mechanism, comprising:
    a fixture configured to hold the light source relative to a mounting region of the slider; and
    a controller configured to receive the electrical signal, compare a value of a signal parameter to a threshold value, and to operate the fixture to cause movement of the light source relative to the slider in cross-track, down-track, and gap directions based on the comparison;
a second light source configured to illuminate the ABS; and
a second detector configured to form an image of the ABS based on the rejected light.

9. The apparatus of claim 8, wherein the first detector comprises a non-imaging detector, such as a photodetector.

10. The apparatus of claim 8, wherein the second detector comprises a charge coupled device.

11. The apparatus of claim 8, wherein:
the electrical signal comprises an amplitude as a function of time; and
the controller includes a processor configured to process the electrical signal to detect a signal peak.

12. The apparatus of claim 11, wherein the processor is configured to identify alignment coordinates for the light source based on the signal peak.

13. The apparatus of claim 8, wherein the controller comprises a processor configured to operate the fixture to move the light source relative to the slider and to process the electrical signal.

14. An apparatus, comprising:
a polarizing filter configured to filter light generated by a first light source and emerging from an air bearing surface (ABS) of a heat assisted magnetic recording slider, the light emerging from the ABS including light emitted by a near field transducer in response to optical excitation and having a component of a first polarization state, a second portion of the light including at least one of stray light and illumination background, the second portion of light comprising polarization states different from the first polarization state, the polarizing filter configured to substantially transmit light having the first polarization state and to substantially reject light having a polarization state orthogonal to the first polarization state;
a second light source configured to illuminate the ABS;
a first detector arranged to detect light transmitted through the polarizing filter and to generate an electrical signal in response to detected light;
a second detector configured to form an image of the ABS based on the rejected light; and
an alignment mechanism configured to align the first light source with the slider in cross-track, down-track, and gap directions based on the electrical signal and identify a position of the light source relative to the slider that satisfies alignment criteria by comparing a value of a signal parameter to a threshold value and identifying the position in response to the value of the signal parameter exceeding the threshold value.

15. The apparatus of claim 14, wherein;
the signal comprises amplitude with respect to position; and
alignment mechanism is configured to align the first light source with the slider based on a full width half maximum of the signal in multiple dimensions.

16. The apparatus of claim 14, wherein the second detector comprises a charge coupled device.

17. The method of claim 7, wherein the lens has a numerical aperture greater than 1.25.

* * * * *